Sept. 26, 1933.  H. V. ALEXANDERSSON  1,928,521
SWITCHING ARRANGEMENT FOR COMPENSATING VOLTAGE VARIATIONS
Filed Sept. 8, 1930

INVENTOR
H. V. Alexandersson
By: Marks & Clerk
Attys.

Patented Sept. 26, 1933

1,928,521

UNITED STATES PATENT OFFICE 1,928,521

SWITCHING ARRANGEMENT FOR COMPENSATING VOLTAGE VARIATIONS

Harald Valdemar Alexandersson, Stockholm, Sweden, assignor to Telefonaktiebolaget L. M. Ericsson, Stockholm, Sweden, a company of Sweden Application September 8, 1930, Serial No. 480,512, and in Sweden September 13, 1929

1 Claim. (Cl. 179—16)

The present invention has for its object a switching arrangement in telephone plants. More especially, the invention relates to telephone plants having a signalling relay connected between the central battery and the feed coils of the talking lines.

The invention is substantially characterized in that the relay, which is adapted to be actuated upon calls, is shunted with a connecting element, of which the resistance is changing in dependency of the current flowing through said element in such a manner that said resistance decreases with an increasing current and vice versa.

The connecting element may consist of a device having an electrical valve action, such as a rectifier, a discharge tube, or the like. It may also consist of a substance having a negative temperature coefficient, i. e. a substance, the electrical resistance of which, under the influence of the heat generated by the current, decreases with an increasing current and vice versa. Preferably a so-called dry rectifier is used consisting of a number of metal plates disposed on top of each other, by way of example copper plates which on the one side are coated by a layer of cuprous oxide.

The invention may also be applied in alternating current circuits the shunt then consisting of two parallel connected rectifiers or the like turned in opposite directions which are connected into circuit parallelly with a resistance in which a compensation of the voltage variations is desired.

Figure 1:
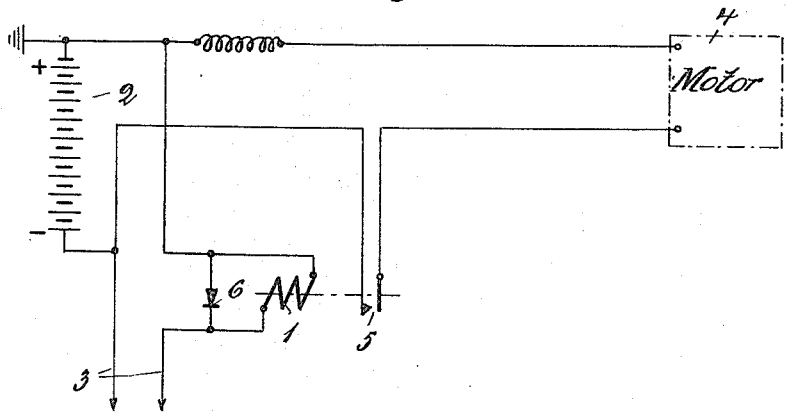
Figure 2:
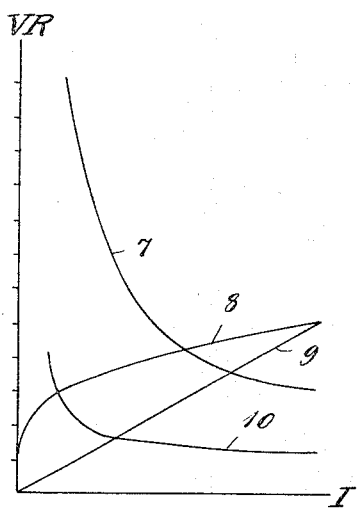
Figure 3:
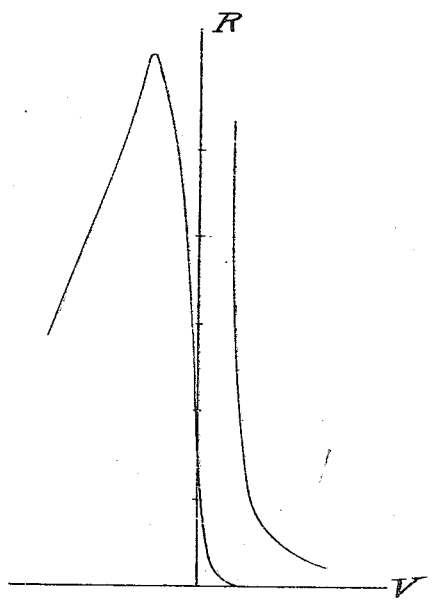

The invention will be more closely described with reference to the accompanying drawing on which Figure 1 shows an embodiment of the invention whereas Figures 2 and 3 are diagrams which will be more closely described in the following.

In Figure 1 there are shown some of the circuits in a telephone plant having a signalling relay connected into circuit between a central battery and the talking lines and adapted to be actuated upon calls and to perform a switching operation common to all calls. In the example shown on the drawing such a relay 1 is connected into circuit in one line branch of the talking line 3 extending from the central battery 2 to which line the different talking lines are connected in known manner over feed coils. The relay is here adapted to close the circuit of a motor 4, upon calls, which motor, by way of example, may serve to drive selectors or other mechanical devices and which normally is disconnected but is started as soon as a call occurs. When current is tapped off from the battery 2 on account of a call, the relay 1 is energized and closes at its contact 5 the circuit of the motor 4. The relay 1 must consequently be so sensitive that it is actuated by the current generated by a single call. The relay 1 must, besides, be of such a nature that the drop of voltage in its winding is not too high at the maximum load and preferably not exceeding 0.5 volts in order to avoid overhearing. By connecting a rectifier 6 or the like into circuit parallelly with the relay 1, the relay may, according to the invention, be made highly sensitive at the same time as a drop of voltage in the winding upon a maximum load may be kept at a low value.

A relay disposed according to Figure 1 may also be advantageously used for switching on and off a current source for charging the battery 2 in such cases when charging has to take place only during a conversation.

Figure 2 is a diagram in which the vertical axis is marked VR denoting voltage and resistance, while the horizontal axis is marked I denoting amperes and showing curves obtained in measurements in a circuit arrangement according to Figure 1. The measurements are made for amperages in the line 3 up to nine amperes. The curve 7 represents the total resistance of the relay 1 and the rectifier 6 parallel connected therewith whereas the curve 8 shows the corresponding drop of voltage for said resistance. At nine amperes the drop of voltage will be 0.52 volts whereas said drop at 0.5 amperes amounts to 0.25 volts. The straight line 9 shows in comparison the drop of voltage at constant resistance, from which we make the conclusion that the drop of voltage at 0.5 amperes only amounts to about 0.03 volts and thus is about 8.5 times less than when using a rectifier shunt according to the invention. In an arrangement according to the invention the relay will thus be considerably more sensitive at small amperages.

An arrangement according to Figure 1 is also very advantageous in regard to the overhearing or cross-talk phenomena which occur in central battery systems thereby that a part of the speech currents, in spite of the feed coils, enter the battery and bring about voltage variations therein which may influence other talking circuits. One has then to take into account those small voltage variations $\Delta V$, which are generated by a certain current variation $\Delta I$, corresponding to an "cross-talk resistance"

$$\frac{\Delta V}{\Delta I} \text{ or } \frac{dV}{dI}$$

the amplitude of which is dependent upon the slope of the curve 8 for the drop of voltage. Apparently said curve to its greater portion has a less angle of slope than said line 9 representing the drop of voltage for a relay having a shunt of constant resistance. The cross-talk resistance is consequently correspondingly less. The curve 10 represents the cross-talk resistance $$\frac{dV}{dI}$$

which falls considerably lower than the resistance curve 7 and to its greater portion has lower values than the resistance corresponding to the line 9. The arrangement in question results thus in a reduction of the voltage variations caused by the speech currents and a corresponding improvement as regards the overhearing.

Figure 3 in which the vertical axis is marked R denoting resistance and the horizontal axis is marked V denoting voltage and shows the curve of the resistance of a dry rectifier composed of metal plates as a function of the impressed voltage. From this we make the conclusion that the curve has the desired appearance only at voltages of a definite direction. In circuits carrying direct current it is consequently of importance that the rectifier element is connected into circuit in the correct direction in relation to the current direction. A rectifier element of the kind in question should consequently be so connected into circuit that the current passes through the element in the direction in which the element offers the smallest resistance.

I claim:—

In a switching arrangement for telephone systems, a central battery, a plurality of talking lines, two conductors in each of said lines connected to opposite poles of the battery each over a feed coil, a signalling relay connected into circuit between the battery and the feeding coil, and a connecting element having electrical valve action shunted with said relay.

HARALD VALDEMAR ALEXANDERSSON.